US009042338B2

(12) United States Patent
Karls

(10) Patent No.: US 9,042,338 B2
(45) Date of Patent: May 26, 2015

(54) COMMUNICATION DEVICE AND METHOD FOR TRANSMITTING DATA

(75) Inventor: Ingolf Karls, Feldkirchen (DE)

(73) Assignee: Intel Mobile Communications GmbH, Neubiberg (DE)

(*) Notice: Subject to any disclaimer, the term of this patent is extended or adjusted under 35 U.S.C. 154(b) by 1121 days.

(21) Appl. No.: 11/774,889

(22) Filed: Jul. 9, 2007

(65) Prior Publication Data

US 2009/0016245 A1    Jan. 15, 2009

(51) Int. Cl.
*H04W 88/06* (2009.01)
*H04W 48/02* (2009.01)
*H04W 48/18* (2009.01)

(52) U.S. Cl.
CPC .............. *H04W 88/06* (2013.01); *H04W 48/18* (2013.01)

(58) Field of Classification Search
CPC .......... H04W 36/0066; H04W 76/026; H04W 88/06; H04W 88/10; H04W 48/18
USPC .................. 370/328–329, 342–345, 347; 455/436–444, 448, 451, 552.1
See application file for complete search history.

(56) References Cited

U.S. PATENT DOCUMENTS

| 6,813,256 | B1* | 11/2004 | Nevo et al. ................ 370/335 |
| 7,865,192 | B2  | 1/2011  | Fukumoto et al. |
| 2004/0076179 | A1* | 4/2004 | Kaminski et al. .......... 370/466 |
| 2004/0224719 | A1  | 11/2004 | Nounin et al. |
| 2005/0068965 | A1  | 3/2005  | Lin et al. |
| 2005/0254469 | A1* | 11/2005 | Verma et al. .............. 370/338 |
| 2006/0009230 | A1* | 1/2006  | Fukumoto et al. ......... 455/452.1 |
| 2008/0192681 | A1* | 8/2008  | Lee et al. .................. 370/328 |
| 2008/0205345 | A1* | 8/2008  | Sachs et al. ............... 370/332 |
| 2009/0111458 | A1* | 4/2009  | Fox et al. .................. 455/422.1 |

FOREIGN PATENT DOCUMENTS

| EP | 1 283 617 A2 | 2/2003 |
| JP | 62-076935 A  | 4/1987 |
| JP | 9-200825 A   | 7/1997 |

(Continued)

OTHER PUBLICATIONS

Sachs, Joachim et al.; "A Generic Link Layer in a Beyond 3G Multi-Radio Access Architecture"; Communications, Circuits and Systems 2004, ICCCAS 2004, 2004 Internat. Ional Conference on Chengu, China, Jun. 27-29, 2004, Piscataway, NJ, USA, IEEE, US, Jun. 27, 2004, pp. 447-451 vol. 1.

(Continued)

*Primary Examiner* — George Eng
*Assistant Examiner* — Marcus Hammonds
(74) *Attorney, Agent, or Firm* — Schiff Hardin LLP

(57) ABSTRACT

Embodiments of the invention relate generally to communication devices and to a method for transmitting data. In an embodiment of the invention, a communication device is provided. The communication device may include a first access technology circuit providing signal transmission in accordance with a first access technology to transmit user data encoded in accordance with the first access technology, and a second access technology circuit providing signal transmission in accordance with a second access technology, wherein the second access technology is different from the first access technology, to transmit control data encoded in accordance with the first access technology and to transmit control data encoded in accordance with the second access technology.

24 Claims, 8 Drawing Sheets

(56) References Cited

FOREIGN PATENT DOCUMENTS

| JP | 2003-143651 A | 5/2003 |
|----|---------------|--------|
| JP | 2005-354537 A | 12/2005 |
| JP | 2006-005653 A | 1/2006 |
| WO | WO-01/00405 A2 | 1/2001 |
| WO | WO-01/24567 A1 | 4/2001 |
| WO | WO-01/91399 A2 | 11/2001 |

OTHER PUBLICATIONS

Magnusson, Per et al.; "Multi-Radio Resource Management for Communication Networks beyond 3G"; Vehicular Technology Conference, 2005, IEEE 62nd Dallas, TX USA, Sep. 25-28, 2005, Piscataway, NJ, USA, IEEE, vol. 3, pp. 1653-1657.

Johnsson, M. et al; "Ambient Networks—A Framework for Multi-Access Control in Hetergeneous Networks"; Vehicular Technology Conference, 2006; VTC—2006 Fall. 2006 IEEE 64th, 2006; URL: http://ieeexplore.ieee.org/stamp/stamp.jsp?tp=&arnumber=4109890.

Japanese Office Action, issued on Feb. 14, 2012 for corresponding application No. JP 2010-515452 (and English translation).

\* cited by examiner

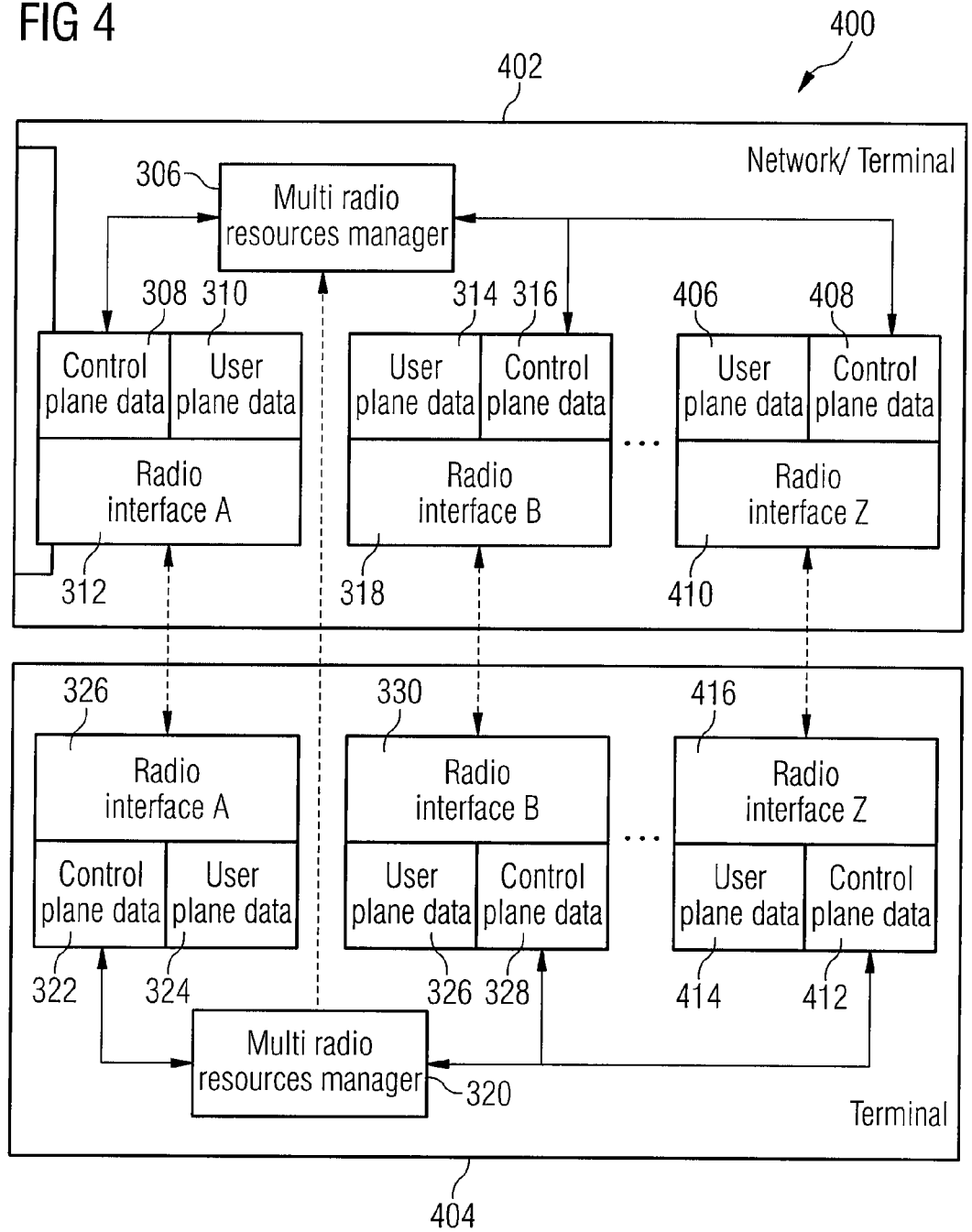

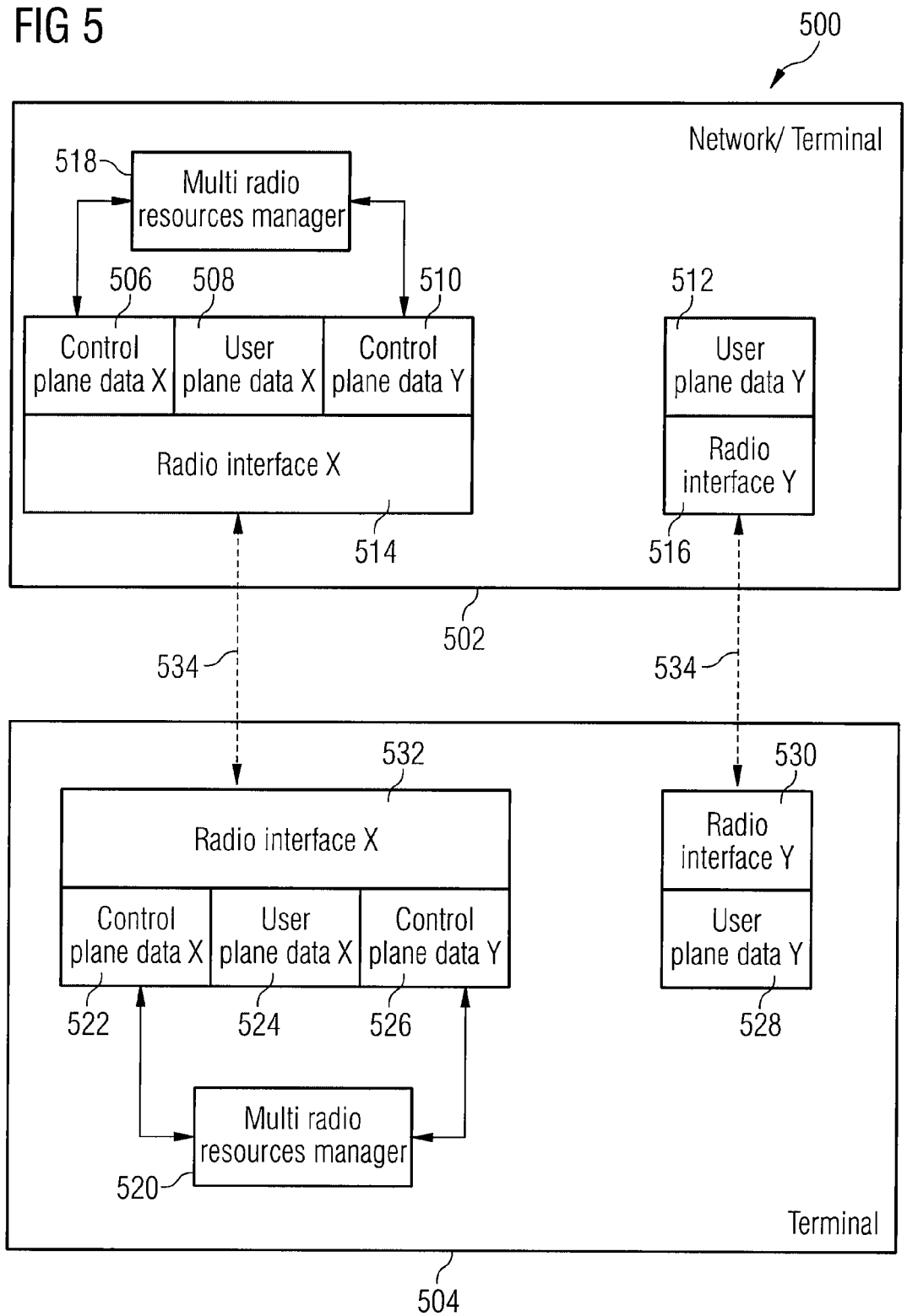

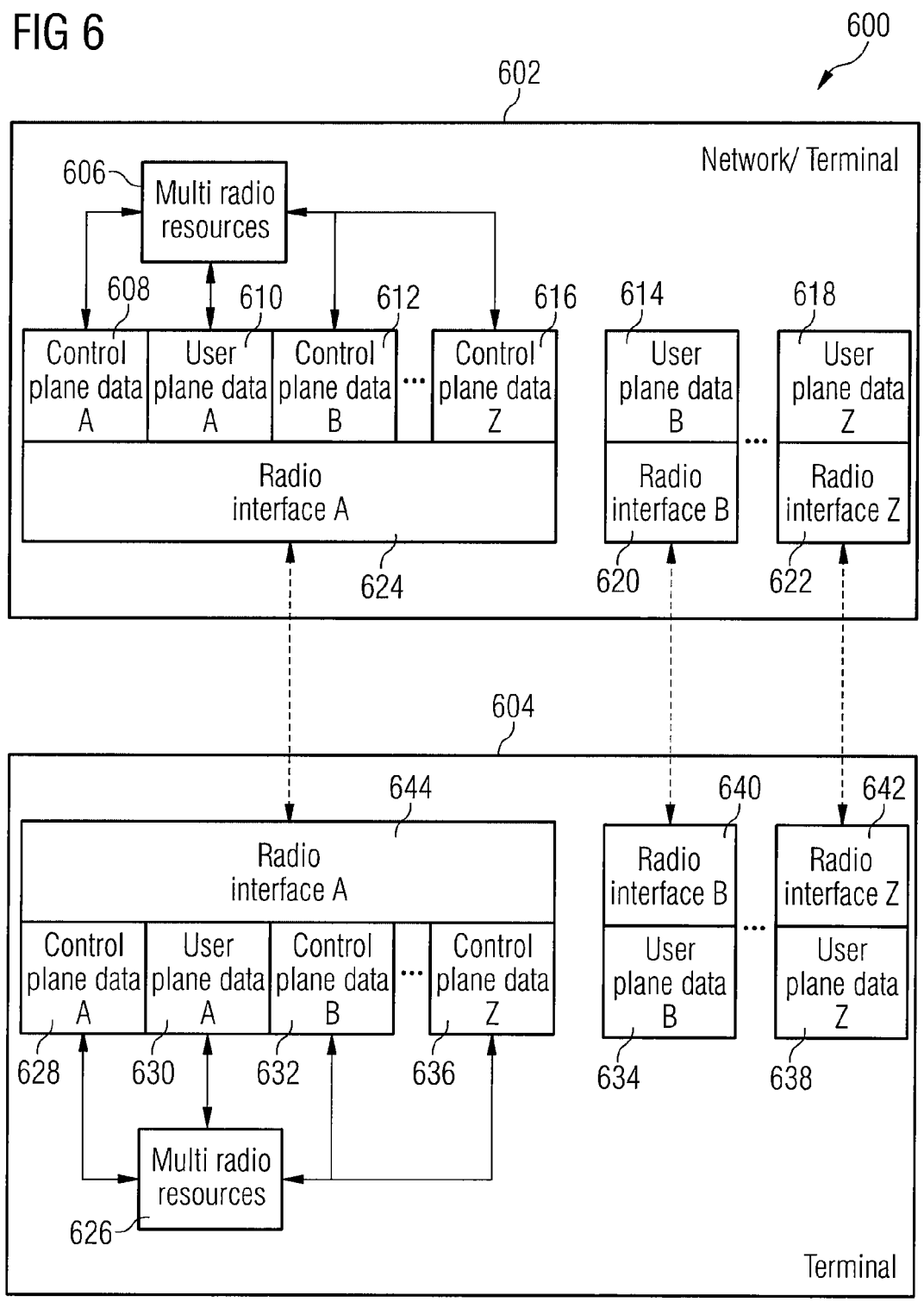

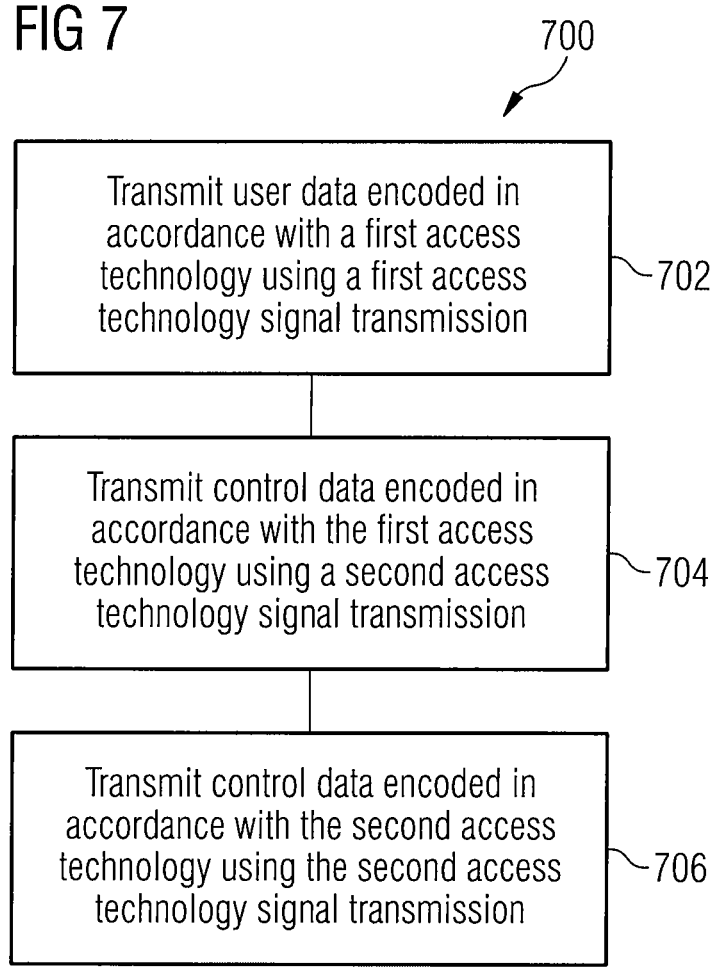

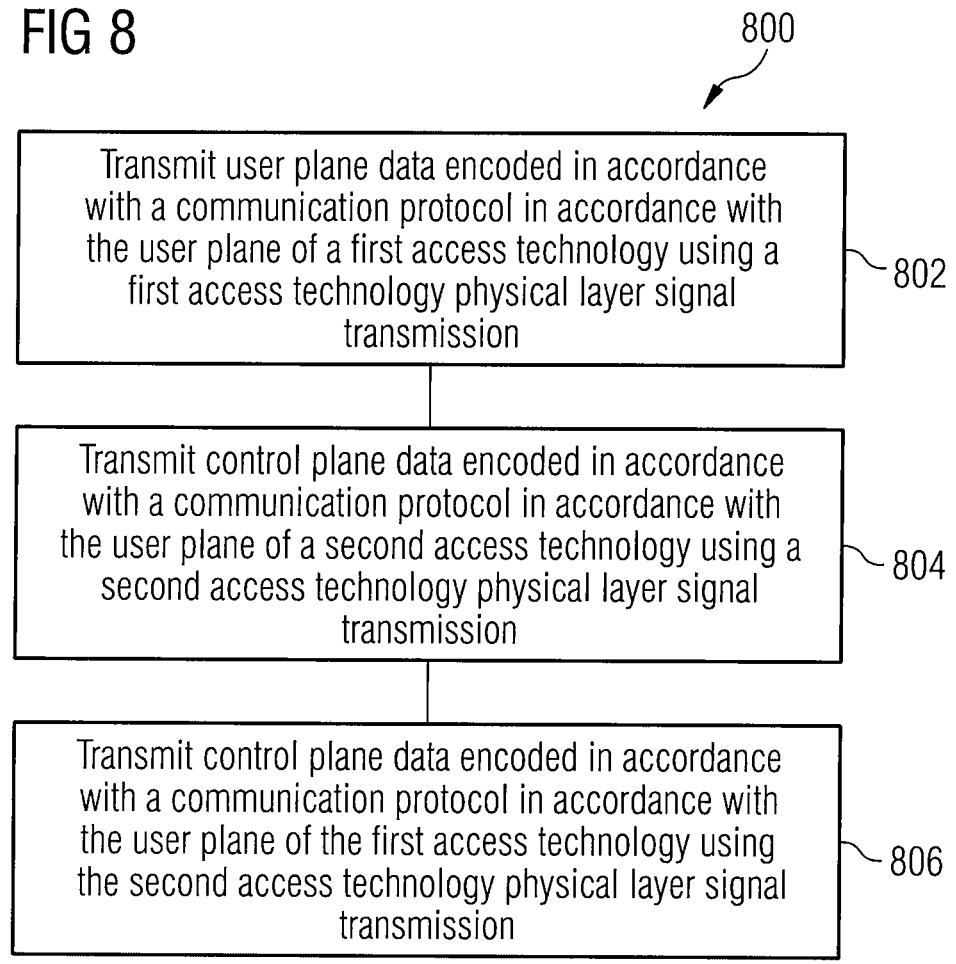

COMMUNICATION DEVICE AND METHOD FOR TRANSMITTING DATA

TECHNICAL FIELD

Embodiments of the invention relate generally to communication devices and to a method for transmitting data.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 4 shows another multi access architecture with one radio interface for each radio access technology;

FIG. 5 shows a multi access architecture in accordance with an embodiment of the invention;

FIG. 6 shows a multi access architecture in accordance with another embodiment of the invention;

FIG. 7 shows a method for transmitting data in accordance with an embodiment of the invention; and FIG. 8 shows a method for transmitting data in accordance with another embodiment of the invention.

DESCRIPTION

Figure 1:
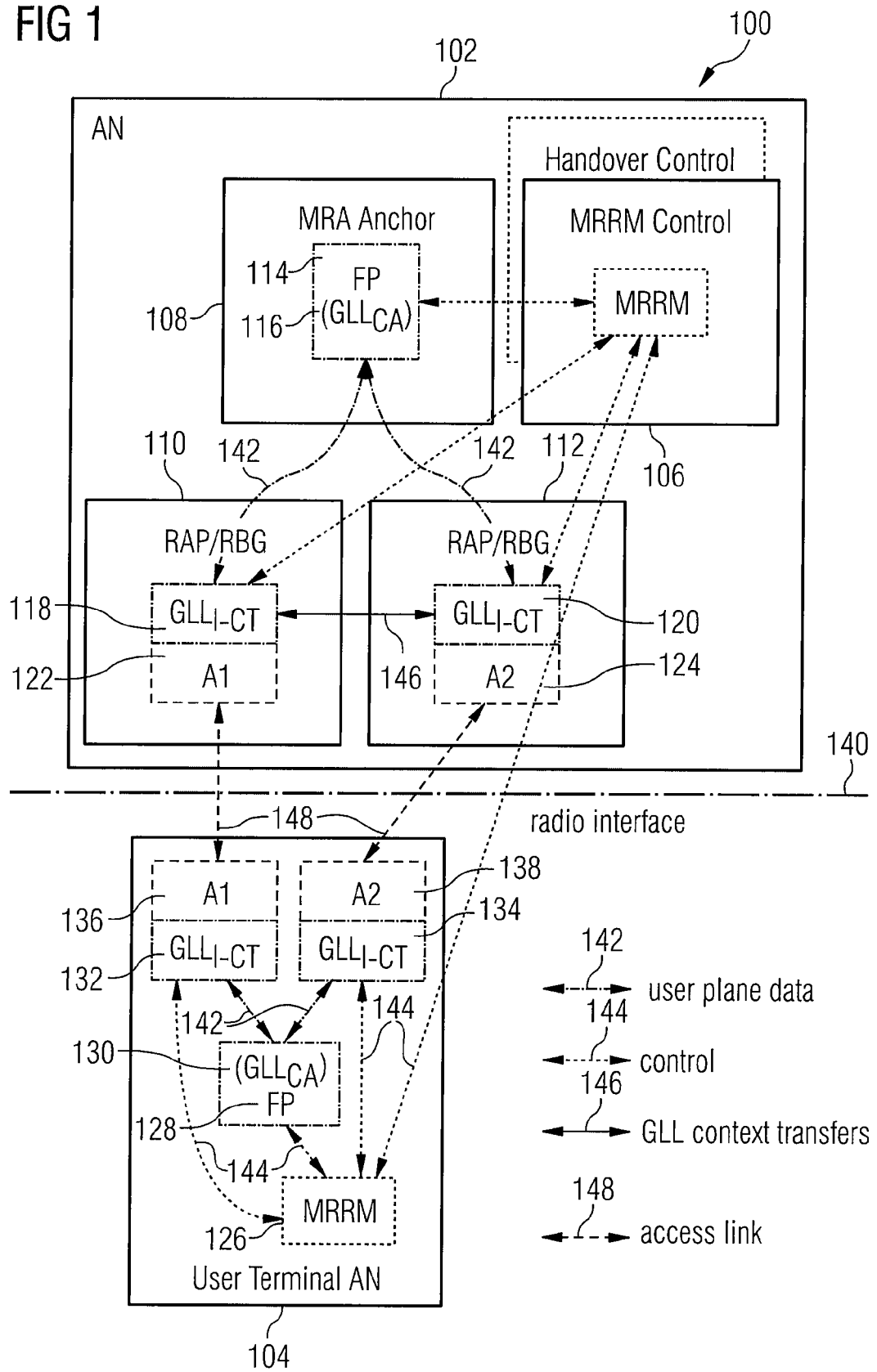
FIG. 1 shows a multi access architecture environment in accordance with an embodiment of the invention.

International standardization groups such as e.g. ITU, WWRF, etc. currently develop solutions for the integration of heterogeneous radio technologies in a network architecture with multiple different radio accesses, also referred to as radio access networks (RANs). By doing this, it is intended to develop the potential of the so called "best quality of experience" including the radio connection for the end-user. By way of example, an efficient management (e.g. cost vs. bandwidth, load) service continuity and service handover should be provided.

In addition, frequency spectrum is more and more in demand and the exposure dose due to the radio technologies should be kept limited or even be reduced in the future. An approach such as the so called "Open Spectrum Access" and "Spectrum Pooling" should provide bandwidth as and when required for so called "Application Controlled Networks/Ambient Networks", should use existing spectrum in a more efficient manner and should reduce the exposure dose.

The advancement in semiconductor technology allows the integration of different wireless radio access technologies such as e.g. dual-mode Modem Bluetooth/IEEE 802.11, IEEE 802.11/WiMAX, Bluetooth/WiMEDIA or multi-mode Modem Bluetooth, IEEE 802.11, GSM/GPRS/EDGE/UMTS or DVB-T/H. The control signalling (in other words, the transmission of control data) and the user data transmission, however, conventionally is provided for each wireless transmission technology (in the following also referred to as access technology, in an embodiment of the invention, radio access technology) via particular communication protocol stacks assigned to each access technology, and therewith via technically separated protocol layers, which may make an overall control difficult or inefficient for an above mentioned network architecture.

In an embodiment of the invention, methods implemented in an ambient network realize the integration of heterogeneous wireless radio technologies (hereinafter also referred to as radio access technologies) in the form of multi-mode network access devices in order to establish possibilities of a flexible usage of different characteristics of the different radio access technologies. In an embodiment of the invention, an ambient network architecture provides for the cooperation of heterogeneous radio access technologies by so called inter-network agreements between access networks without a pre-configuration or pre-negotiation between radio access technologies being necessary.

In an embodiment of the invention, the so called "Mobile Radio Access" (MRA) architecture is used. In an embodiment of the invention, the "Mobile Radio Access" (MRA) architecture includes a core network and a fully or partially shared central network controller. The network controller may include various components, e.g. the so called "Multi Radio Access Selection" (MRAS) component, the so called "Multi Radio Resource Management" (MRRM) component and the so called "Generic Link Layer" (GLL) component.

In an embodiment of the invention, the MRRM component controls the shared radio resources and the load distribution between different radio access networks. Furthermore, in an embodiment of the invention, the GLL component provides a building set of configurable connection layer protocols for the cooperation of different radio access technologies. The functionality of the MRRM component may be implemented in centralized or de-centralized manner dependent on the role that is provided for the respective network components (e.g. media server (MS) or peer-to-peer (P2P)) and should allow for single-hop networks as well as multi-hop networks and multicast structures as well as broadcast structures.

One task of the MRAS is to select, corresponding to the use function (which may be derived from different performance metrics such as e.g. achievable data rate, communication costs, resource load and probability of blocking or loosing the connection), the radio connection having the best quality (highest signal-to-noise ratio (SNR)), a high spectral efficiency (Mbit/Hz) also considering the aspect of the radio access overload. This may e.g. be provided by means of load distribution within available radio connections.

A comparable solution for a central and de-central control substantially improves the quality of the wireless data transmission and the security of the control functions, however, currently requires parallel complex processing resources and therewith high costs. Pre-defined lists of e.g. radio access technologies, in order e.g. to switch in a very fast manner to optimal radio connections on GLL level and independent from the MRRM component, will also substantially increase the expenditure, are only little flexible and require a close integration and interaction of the radio access functions and the GLL functions.

In an embodiment of the invention, statistical parameters for the decision may be "Access Point" (AP) capacity, Quality of experience (QoE) requirements, radio access technology preference, costs (e.g. EUR/min, EUR/MB, USD/min, USD/MB), terminal device capabilities, integration level of the radio access technologies, etc. This information should be signaled between the MRRM components e.g. via the core network or via the terminal devices. In a conventional architecture, this is costly, since currently, a common "control plane" component is provided in order to allow the interworking and end-to-end (E2E) QoS in heterogeneous networks.

It should be noted that although the embodiments described in detail relate to different radio access technologies, they are not limited to only radio access technologies but also include other access technologies such as e.g. landline (wireline) access technologies. Furthermore, in an embodiment of the invention, a hybrid system may be provided including radio access technologies as well as other access technologies such as e.g. landline access technologies.

In the following, the meaning of some expressions used in this description in accordance with an embodiment of the invention will be explained in more detail. It should be noted that the given explanations are not intended to necessarily limit the scope of the respective expressions but are used just for illustration purposes.

In an embodiment of the invention, an ambient network may be understood as being a basic building block of networking, scaling from a single network node to large networks with common network resource control. An ambient network may expose its communication resources to other ambient networks via a well defined external interface, the so called ambient network interface. Communication services are made available to applications and services via a so called ambient service interface, and the communication resources may be accessed through the ambient resource interface.

In an embodiment of the invention, the ambient network interface connects the so-called ambient control spaces of different ambient networks. The ambient network interface may be used for negotiation of network composition agreements and for transferring control information between the networks. The ambient network interface do not need to exist on every node of the ambient network, but rather on the nodes that collectively implement the core control space functionality.

In an embodiment of the invention, the ambient service interface comprises the collection of service interfaces exported by the functional entities that constitutes the ambient control space. The ambient service interface may be understood as being the "upper layer" interface of the ambient control space. It may be accessible from any entity (e.g. end-user applications, management application, control applications, etc.) outside the ambient control space with appropriate access permissions. It hides the individual functional entities from the "user" of the interface. From an ambient service interface perspective, the structuring of an ambient control space into functional entities is therefore only an internal issue.

In an embodiment of the invention, the ambient resource interface may be understood as being the lower service interface located inside the ambient network node providing an abstraction of the resources in the underlying connectivity infrastructure.

In an embodiment of the invention, the ambient control space may be understood as being the set of all control layer functions and representations of resources in an ambient network. In addition to the actual control functions the ambient control space may further include common framework functions allowing the control functions to plug into the ambient control space, execute their control tasks and coordinate with other functions present in the ambient control space.

In an embodiment of the invention, a composition agreement may include the policies to be followed in the composed ambient networks, the identifier of the composed ambient networks, how logical and physical resources are controlled and/or shared between the composing ambient networks, etc.

In an embodiment of the invention, a functional entity may be understood as an entity that embodies the features and functions of some limited part of a telecommunication system, and specifically for this context a limited part of the ambient control space. This also may mean that a functional entity in the scope of an ambient network may be specific and explicitly needed for communication and in the support thereof, be it human-human, human-machine or machine-machine. A functional entity may contain a number of (sub-) functional entities. Each functional entity may provide a well-defined interface through which the features and functions of that functional entity are made available to other functional entities.

In an embodiment of the invention, a generic link layer may be understood as representing generic functions which enable and facilitate efficient link-layer interworking among multiple, possibly diverse, radio accesses.

In an embodiment of the invention, an interface may be understood a being an abstraction of the behavior of an object that may consist of a subset of the interactions of that object together with a set of constraints on when they may occur. An interface may be defined by various characteristics pertaining to the functions, physical interconnections, signal exchanges and other characteristics as appropriate.

In an embodiment of the invention, multi-radio resource management may be understood as being a generic functionality for the ambient network-aware management of one or multiple radio accesses. Multi-radio resource management may cover network complementing radio resource management functions as well as ambient network-compliant radio access coordination functions.

In an embodiment of the invention, quality of service may be understood as the performance specification of a flow or service. Quality of service may be quantitatively indicated by performance parameters such as guaranteed bit-rate, bit error ratio, etc. Quality of service generally may mean the quality of service when it is actually provided, however, a quality of service may also exist for services that still have to be provided.

In an embodiment of the invention, a radio access may correspond to a radio channel. Multiple radio accesses may correspond to uncoupled radio channels across different radio access technologies or within a single radio access technology.

In an embodiment of the invention, a radio access technology may be understood as being the type of radio technology and its corresponding wireless interface between two communication nodes. It can be already defined (legacy radio access technology like GSM, UMTS, EDGE, GPRS, Bluetooth, HiperLAN, IEEE 802.16, and IEEE 802.11, etc.) or future radio access technology.

In an embodiment of the invention, an access technology may be understood as being the type of technology and its corresponding interface between two communication nodes. It can be already defined or future access technology.

In an embodiment of the invention, a radio channel may be understood as being a radio access technology specific transport channel utilized for user data transmission. A wireless channel belongs to a radio access technology and in its physical realization it can be either dedicated or shared by many users.

In an embodiment of the invention, radio resource management may be understood as being a generic functionality for the ambient network-unaware management of one or multiple radio accesses. Radio resource management may cover network-intrinsic radio resource management functions, e.g. the current 3GPP-standardised GSM-UMTS handover mechanism.

In the context of this description, a circuit may be understood as including a hard-wired circuit such as e.g. a circuit implemented as an application-specific integrated circuit (ASIC) or a hard-wired logic gate structure, or a programmable circuit such as e.g. a field-programmable gate array (FPGA), or any other programmable logic, e.g. implemented as a microprocessor, being programmed to provide the respective function of the circuit.

FIG. 1 shows a multi access architecture environment in accordance with an embodiment of the invention.

As shown in FIG. 1, a multi radio access network system 100 includes an ambient network 102 and one or a plurality of communication terminals 104 such as e.g. user terminal devices.

In an embodiment of the invention, the ambient network 102 includes a Multi Radio Resource Management (MRRM) component 106, a Multi Radio Access Selection (MRAS) component 108, and a plurality of radio access point (RAP) components 110, 112. The functionalities of the respective components, which may be implemented by one or more respective circuits, may be as described above.

In an embodiment of the invention, the Multi Radio Access Selection (MRAS) component 108 may include one or more forwarding point (FP) components 114, wherein the forwarding point (FP) component 114 may in turn include a Generic Link Layer (GLL) component 116.

Furthermore, each of the radio access point (RAP) components 110, 112 may include a respective Generic Link Layer (GLL) component 118, 120 and a physical layer signal transmission component 122, 124 to provide a signal transmission in accordance with the respective radio access technology.

In an embodiment of the invention, the communication terminal 104 may also include a Multi Radio Resource Management (MRRM) component 126 for peer-to-peer communication with the Multi Radio Resource Management (MRRM) component 106 of the ambient network 102, as will be described in more detail below. Furthermore, the communication terminal 104 may include one or more forwarding point (FP) components 128, wherein the forwarding point (FP) component 128 may in turn include a first Generic Link Layer (GLL) component 130. The communication terminal 104 may further include second Generic Link Layer (GLL) components (one for each provided radio access technology), in the illustrated embodiment e.g. two second Generic Link Layer (GLL) components 132, 134, and physical layer signal transmission components (one for each provided radio access technology), in the illustrated embodiment e.g. two physical layer signal transmission components 136, 138 to provide a signal transmission in accordance with the respective radio access technology.

As shown in FIG. 1, the ambient network 102 is connected to the communication terminal 104 via a communication interface, e.g. via a radio interface 140.

FIG. 1 further shows the user plane data flow (symbolized by means of first arrows 142) provided in the multi radio access network system 100.

In an embodiment of the invention, the user plane data flow is provided between the Generic Link Layer (GLL) component 116 of the forwarding point (FP) component 114 and the Generic Link Layer (GLL) components 118, 120 of the respective radio access point (RAP) component 110, 112 in the ambient network 102, on the one hand, and between the first Generic Link Layer (GLL) component 130 and the second Generic Link Layer (GLL) components 132, 134 in the communication terminal 104, on the other hand.

In an embodiment of the invention, the communication protocols provided for the respective access technologies such as e.g. radio access technologies may be grouped or partitioned "horizontally" in so called communication protocol layers in accordance with the principles outlined in the Open System Interconnection (OSI) reference model standardized by the International Organization for Standardization (ISO).

Furthermore, in an embodiment of the invention, the communication protocols provided for the respective access technologies such as e.g. radio access technologies may be grouped or partitioned "vertically" in so called communication protocol planes, e.g. into a control plane (e.g. provided to process control signals or control signal messages) and into a user plane (e.g. provided to process user data of the user).

In an embodiment of the invention, the user plane may include one or more data streams and the so called data bearers (the task of which is to transport the user data). The data bearers may be established by the transport network control plane. A data stream may be characterized by one or more interface specific frame communication protocols and serves for the transmission of transparent user data coming from higher communication protocol layers.

In an embodiment of the invention, the control plane may include one or more application protocols and the signaling bearers which may transport the messages of the application communication protocols. In an embodiment of the invention, the application communication protocols are mainly used for establishing bearers in the physical layers (also referred to as radio network layer). In an embodiment of the invention, e.g. in the case of UMTS, an application communication protocol is provided for each UTRAN interface ($I_{ub}$, $I_{ur}$, $I_{u}$), which are used for transmitting UMTS-specific signaling data and control data within the UTRAN.

Illustratively, in an embodiment of the invention, the user plane includes those components used for transmission of user data in the various access technology specific communication protocol layers, whereas the control plane includes those components used for transmission of control data (e.g. signaling signals or signaling messages) in the various access technology specific communication protocol layers.

Moreover, FIG. 1 shows the control plane data flow (symbolized by means of second arrows 144) provided in the multi radio access network system 100.

In an embodiment of the invention, the control plane data flow is provided between the Multi Radio Resource Management (MRRM) component 106 of the ambient network 102 and the Multi Radio Resource Management (MRRM) component 126 of the communication terminal 104.

As further shown in FIG. 1, a GLL context transfer is provided between the Generic Link Layer (GLL) components 118, 120 of the radio access point (RAP) components 110, 112 (symbolized by means of third arrows 146).

Further, the access links between the physical layer signal transmission component 122 of a first radio access point (RAP) component 110 of the ambient network 102 and a first physical layer signal transmission component 136 of the communication terminal 104 on the one hand, and between the physical layer signal transmission component 124 of a second radio access point (RAP) component 112 of the ambient network 102 and a second physical layer signal transmission component 138 of the communication terminal 104 on the other hand, is symbolized in FIG. 1 by means of fourth arrows 148).

Figure 2:
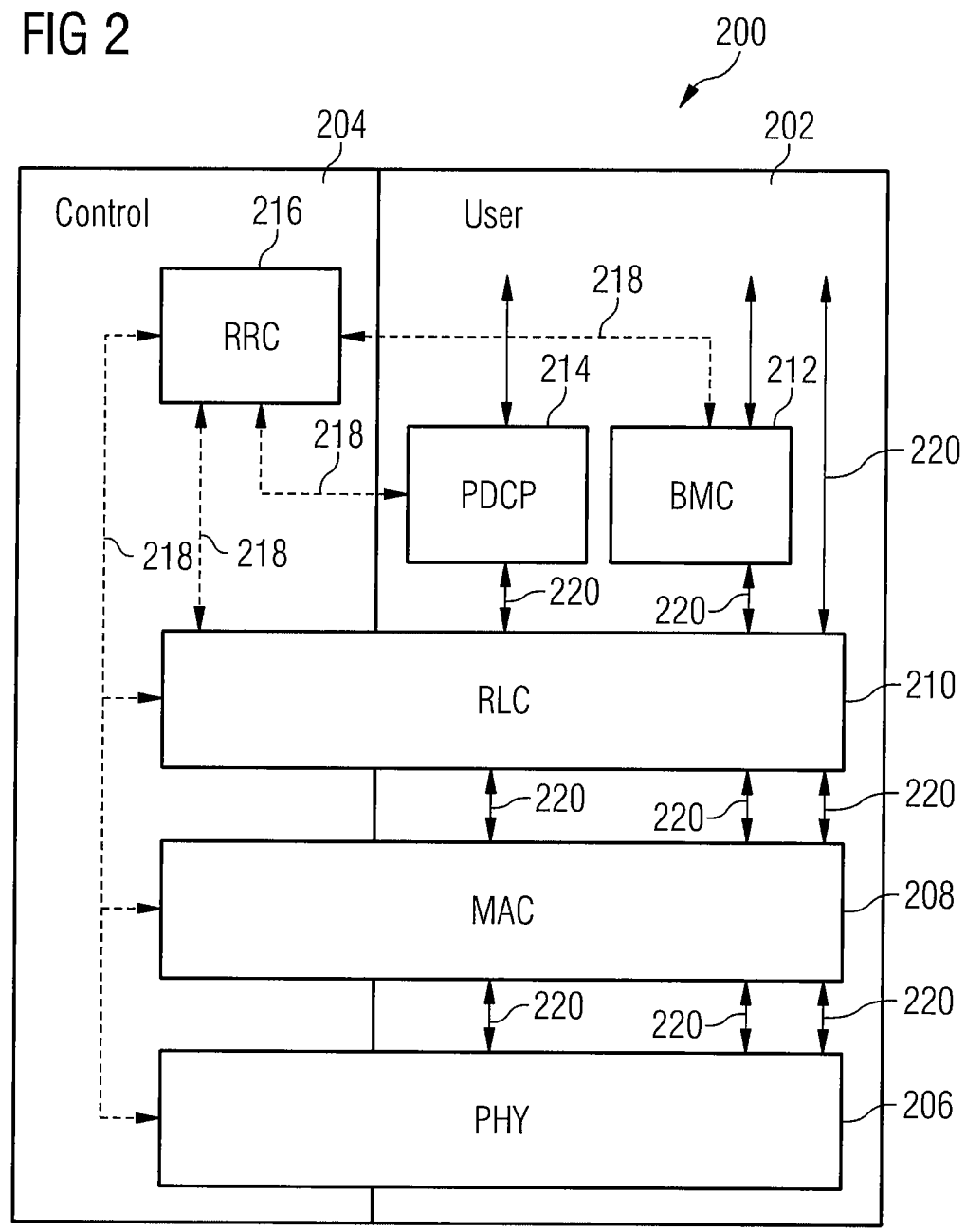
FIG. 2 shows an example of an access network terminal protocol stack showing a user plane and a control plane.

FIG. 2 shows an example of a communication protocol stack 200 showing a user plane 202 and a control plane 204 for the radio access technology GPRS. The person skilled in the art will appreciate that many other structures of the communication protocol stack are provided depending on the respective access technology, e.g. radio access technology.

As shown in FIG. 2, the following communication protocol layer components are provided:
- a physical (PHY) layer component 206;
- a medium access control (MAC) layer component 208;
- a radio link control (RLC) layer component 210;
- a broadcast multicast protocol (BMC) layer component 212;
- packet data convergence protocol (PDCP) layer component 214;
- a radio resource control (RRC) layer component 216.

Each of the physical (PHY) layer component 206, the medium access control (MAC) layer component 208 and the radio link control (RLC) layer component 210 have subcomponents provided for the user plane 202 and the control plane 204, respectively. However, the broadcast multicast protocol (BMC) layer component 212 and the packet data convergence protocol (PDCP) layer component 214 are implemented substantially only within the user plane 202, whereas the radio resource control (RRC) layer component 216 is implemented substantially only within the control plane 204.

The radio resource control (RRC) layer component 216 controls all other mentioned components 206, 208, 210, 212, 214 via control connections 218. Furthermore, the other components may be connected with each other via so called service access points 220 to exchange protocol data units (PDU), for example.

As shown in FIG. 2, the control functions (implemented in the control plane 204) are separated from the user data (the processing of which is implemented in the user plane 202). Usually, the signal transmission via the physical layer is provided, however, using the same physical layer (PHY) component 206.

Figure 3:
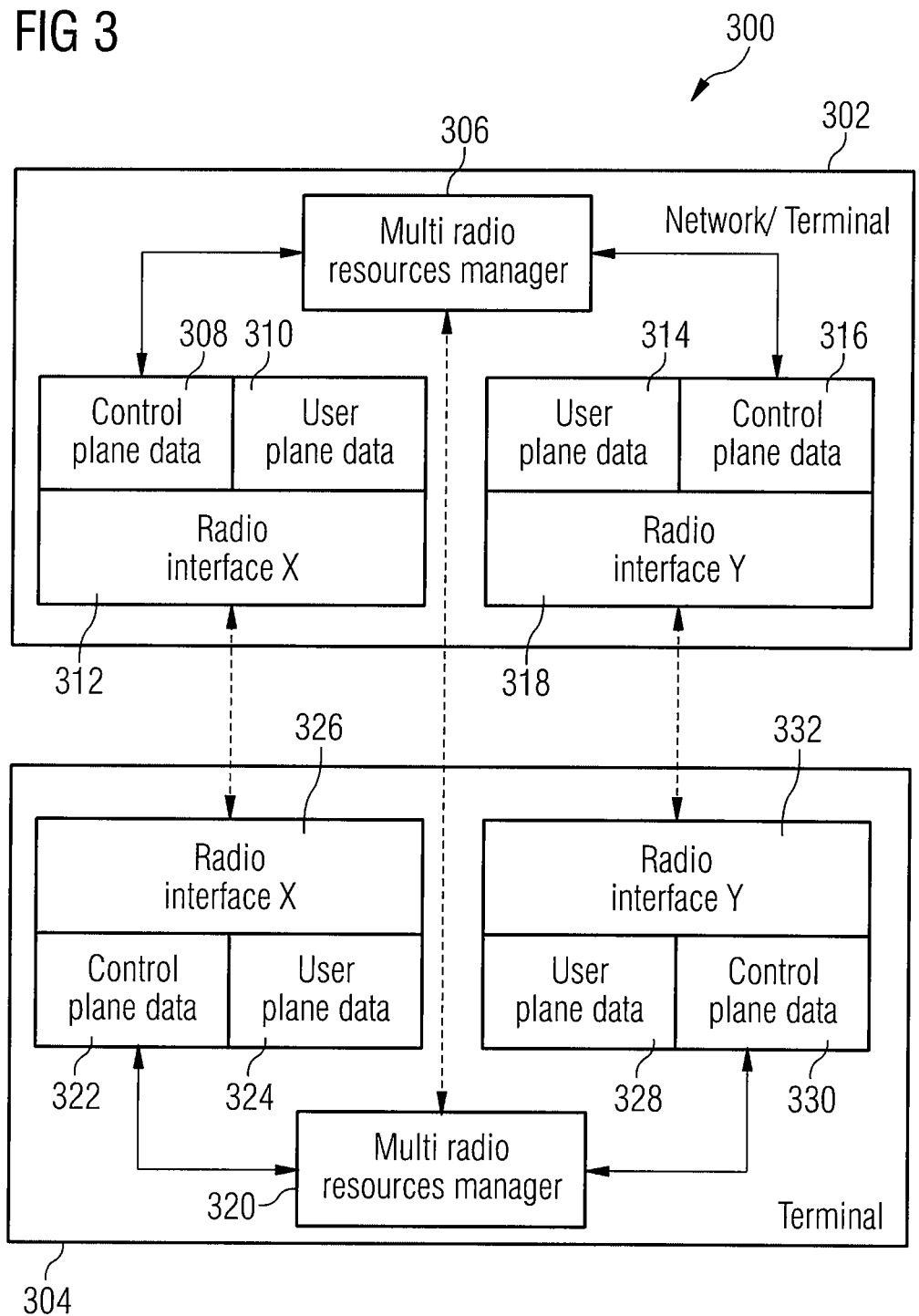
FIG. 3 shows a multi access architecture with one radio interface for each radio access technology.

FIG. 3 shows a multi access architecture 300 with one radio interface for each radio access technology.

As shown in FIG. 3, the multi access architecture 300 includes a communication network 302 (in an alternative embodiment, a communication terminal) and a communication terminal 304 (e.g. a mobile phone, in accordance with UMTS e.g. a User Equipment (UE)). Both, the communication network 302 and the communication terminal 304 have implemented a plurality of radio access technologies, e.g. a first radio access technology X and a second radio access technology Y.

The communication network 302 includes a Multi Radio Resource Management (MRRM) component 306. Furthermore, the communication network 302 includes a control plane component 308 configured to process control plane data and a user plane component 310 configured to process user plane data in accordance with the first radio access technology X. An also provided radio interface component 312 is configured to implement physical layer functionality for signal transmission in accordance with the first radio access technology X and is provided for the transmission of the control plane data and the user plane data encoded in accordance with the respective communication protocols of the first radio access technology X. Moreover, the communication network 302 includes a control plane component 314 configured to process control plane data and a user plane component 316 configured to process user plane data in accordance with the second radio access technology Y. An also provided radio interface component 318 is configured to implement physical layer functionality for signal transmission in accordance with the second radio access technology Y and is provided for the transmission of the control plane data and the user plane data encoded in accordance with the respective communication protocols of the second radio access technology Y.

The communication terminal 304 also includes a corresponding Multi Radio Resource Management (MRRM) component 320. Furthermore, the communication terminal 302 includes a control plane component 322 configured to process control plane data and a user plane component 324 configured to process user plane data in accordance with the first radio access technology X. An also provided radio interface component 326 is configured to implement physical layer functionality for signal transmission in accordance with the first radio access technology X and is provided for the transmission of the control plane data and the user plane data encoded in accordance with the respective communication protocols of the first radio access technology X. Moreover, the communication terminal 304 includes a control plane component 328 configured to process control plane data and a user plane component 330 configured to process user plane data in accordance with the second radio access technology Y. An also provided radio interface component 332 is configured to implement physical layer functionality for signal transmission in accordance with the second radio access technology Y and is provided for the transmission of the control plane data and the user plane data encoded in accordance with the respective communication protocols of the second radio access technology Y.

Thus, illustratively, in this multi access architecture 300 the control data and user data encoded in accordance with one respective radio access technology are transmitted using a radio interface component configured to implement physical layer functionality for signal transmission in accordance with the same radio access technology.

FIG. 4 shows another multi access architecture 400 with one radio interface for each radio access technology.

The multi access architecture 400 of FIG. 4 is similar to the multi access architecture 300 shown in FIG. 3 with the difference, that the multi access architecture 400 further includes components of one or a plurality of additional radio access technologies.

In particular, an ambient network 402 includes, in addition to the components of the first and second radio access technologies X, Y, a control plane component 406 configured to process control plane data and a user plane component 408 configured to process user plane data in accordance with the first radio access technology X. An also provided radio interface component 410 is configured to implement physical layer functionality for signal transmission in accordance with a third radio access technology Z and is provided for the transmission of the control plane data and the user plane data encoded in accordance with the respective communication protocols of the third radio access technology Z.

Furthermore, the communication terminal 404 includes, in addition to the components of the first and second radio access technologies X, Y, a control plane component 412 configured to process control plane data and a user plane component 414 configured to process user plane data in accordance with the third radio access technology Z. An also provided radio interface component 416 is configured to implement physical layer functionality for signal transmission in accordance with the third radio access technology Z and is provided for the transmission of the control plane data and the user plane data encoded in accordance with the respective communication protocols of the third radio access technology Z.

FIG. 5 shows a multi access architecture 500 in accordance with an embodiment of the invention.

In an embodiment of the invention, the multi access architecture 500 includes one or more communication networks 502 (for reasons of simplicity, only one communication network 502 is shown). In an alternative embodiment of the invention, a communication terminal may be provided instead or in addition to the one or more communication networks 502, e.g. a mobile phone, in accordance with UMTS e.g. a User Equipment (UE). In an embodiment of the invention, the multi access architecture 500 further includes one or more communication terminals 504, e.g. a mobile phone, in accordance with UMTS e.g. a User Equipment (UE) (for reasons of simplicity, only one communication terminal 504 is shown). Both, the communication network 502 and the communication terminal 504 have implemented a plurality of radio access technologies, e.g. a first radio access technology X and a second radio access technology Y.

In an embodiment of the invention, the communication network 502 includes a Multi Radio Resource Management (MRRM) component 518 (it should be noted that this component is optional). Furthermore, the communication network 502 includes a control plane component 506 configured to process control plane data and a user plane component 508 configured to process user plane data in accordance with the first radio access technology X. Moreover, the communication network 502 includes a control plane component 510 configured to process control plane data and a user plane component 512 configured to process user plane data in accordance with the second radio access technology Y. An also provided radio interface component 516 is configured to implement physical layer functionality for signal transmission in accordance with the second radio access technology Y and is provided for the transmission of the user plane data encoded in accordance with the respective communication protocols of the second radio access technology Y.

In an embodiment of the invention, the communication network 502 further includes a radio interface component 514 which is configured to implement physical layer functionality for signal transmission in accordance with the first radio access technology X and is provided for the transmission of the control plane data and, optionally, for the user plane data encoded in accordance with the respective communication protocols of the first radio access technology X. The radio interface component 514 is further configured for the transmission of the control plane data encoded in accordance with the respective communication protocols of the second radio access technology Y. In other words, in an embodiment of the invention, the radio interface component 514 is (e.g. exclusively) provided for the transmission of the control data being encoded in accordance with both radio access technologies.

The communication terminal 504 also optionally includes a corresponding Multi Radio Resource Management (MRRM) component 520. Furthermore, the communication terminal 504 may include a control plane component 522 configured to process control plane data and a user plane component 524 configured to process user plane data in accordance with the first radio access technology X. Moreover, the communication terminal 504 may further include a control plane component 526 configured to process control plane data and a user plane component 528 configured to process user plane data in accordance with the second radio access technology Y. An also provided radio interface component 530 is configured to implement physical layer functionality for signal transmission in accordance with the second radio access technology Y and is provided for the transmission of the user plane data encoded in accordance with the respective communication protocols of the second radio access technology Y.

In an embodiment of the invention, the communication terminal 504 further includes a radio interface component 532 which is configured to implement physical layer functionality for signal transmission in accordance with the first radio access technology X and is provided for the transmission of the control plane data and, optionally, for the user plane data encoded in accordance with the respective communication protocols of the first radio access technology X. The radio interface component 532 is further configured for the transmission of the control plane data encoded in accordance with the respective communication protocols of the second radio access technology Y.

In other words, in an embodiment of the invention, the radio interface component 532 is (e.g. exclusively) provided for the transmission of the control data being encoded in accordance with both radio access technologies.

In an embodiment of the invention, the radio interface components as embodiments of respective access technology circuit providing signal transmission in accordance with a respective access technology (e.g. the first and second access technologies, wherein the first and second access technologies may be different access technologies).

In an embodiment of the invention, the radio interface components implement the functions of the physical (PHY) layer (in some embodiments of the invention in addition some functions of the medium access control (MAC) layer) in accordance with the respective access technology. The radio interface components therefore provide signals 534 to be transmitted e.g. via one or more antennas or decoded signals received e.g. via the one or more antennas.

Thus, as shown in FIG. 5, the radio interface component 514 of the communication network 502 is coupled with the control plane component 506 configured to process control plane data in accordance with the first radio access technology X and with the control plane component 510 configured to process control plane data in accordance with the second radio access technology Y. Optionally, the radio interface component 514 is coupled with the user plane component 508 configured to process user plane data in accordance with the first radio access technology X. Furthermore, the radio interface component 532 of the communication terminal 504 is coupled with the control plane component 522 configured to process control plane data in accordance with the first radio access technology X and with the control plane component 526 configured to process control plane data in accordance with the second radio access technology Y. Optionally, the radio interface component 532 is coupled with the user plane component 524 configured to process user plane data in accordance with the first radio access technology X.

In an embodiment of the invention, the first access technology and/or the second access technology may be selected from a group of access technologies consisting of:
  Short-range radio access technology;
  Ad-hoc network radio access technology;
  Private Area Network radio access technology;
  Local Area Network radio access technology;
  Medium Area Network radio access technology;
  Wide Area Network radio access technology.

In an embodiment of the invention, the first access technology and/or the second access technology may be selected from a group of access technologies consisting of: WiBree NFC, IEEE 802.15.4, Bluetooth, IEEE 802.15.1, DECT, IEEE 802.11 a, IEEE 802.11 b, IEEE 802.11 g, IEEE 802.11 n, IEEE 802.11 p, Wireless USB, GSM, GPRS, EDGE, UMTS, CDMA, CDMA 2000, FOMA, WiMAX, Canopy, DAB, DRM, DVB-T, DVB-H, MediaFLO, T-DMB, ISDBT.

It should be noted that the various radio access technologies that may be provided in various embodiments of the invention may have varying characteristics. Thus, also the respective radio interface components (e.g. implemented in the form of radio modems) may have various characteristics, as will become evident from the following comparison of the characteristics of several radio access technologies (also referred to as PHY techniques), which may be used in accordance with various embodiments of the invention.

Technically different radio access technologies may have substantial performance differences with regard to metrics such as e.g. coverage, spectral efficiency, performance efficiency or energy efficiency. By way of example, wireless radio access technologies for a Local Area Network may vary in the range of orders. As a short-range radio access technology, one or more of the following radio access technologies may be used: WiBree, NFC, ZigBee, Bluetooth, DECT, IEEE 802.11 a, IEEE 802.11 b, IEEE 802.11 g, IEEE 802.11 n, IEEE 802.11 p, or Wireless USB (W-USB).

In an embodiment of the invention, ZigBee (IEEE 802.15.4) is provided for the infrastructure-independent linking of sensors, actors and other devices. It supports data rates of e.g. 20 kbit/s, 40 kbit/s, and 250 kbit/s.

In an embodiment of the invention, Bluetooth 1.2 (also referred to as IEEE 802.15.1) specifies a maximum data rate of 720 kbit/s, wherein the version Bluetooth 2.0 can transmit data with a maximum data rate of 2.1 Mbit/s by using Enhanced Data Rate (EDR).

In an embodiment of the invention, in accordance with the current DECT standard, a maximum data rate of 24 kbit/s per time slot is possible, which results in a maximum data rate of 528 kbit/s when all available 24 time slots are bundled.

In an embodiment of the invention, the Wireless Local Area Network (WLAN) standards (as other embodiments of a radio access technology) in accordance with the IEEE standards provide the following maximum data rates:

| | |
|---|---|
| 802.11 a: | 54 Mbit/s; |
| 802.11 b: | 11 Mbit/s; |
| 802.11 g: | 54 Mbit/s; |
| 802.11 n: | 540 Mbit/s; |
| 802.11 p: | 27 Mbit/s. |

In an embodiment of the invention, the Ultra Wideband (UWB) technology as another embodiment of a radio access technology (e.g. UWB in accordance with ECMA-368 or ECMA-369) may provide a data rate in the range of about 110 Mbit/s to about 480 Mbit/s).

The maximum coverage of ZigBee typically is in the range of about 10 m to about 75 m. The maximum coverage of a Bluetooth device are specified as follows: class 1 having a maximum coverage of about 100 m, class 2 having a maximum coverage of about 50 m, and class 3 having a maximum coverage of about 10 m. A wireless DECT telephone has a maximum outdoor coverage of up to about 300 m and a maximum indoor coverage of up to about 50 m. A device in accordance with IEEE 802.11 b or in accordance with IEEE 802.11 g a maximum outdoor coverage of up to about 60 m to 100 m and a maximum indoor coverage of up to about 30 m to 50 m depending on the concrete condition can be achieved. A device in accordance with IEEE 802.11 a or in accordance with IEEE 802.11 n a maximum outdoor coverage of up to about 45 and a maximum indoor coverage of up to about 20 m may be possible. The coverage of an UWB device scales in the range of about 2 m to about 10 m.

A ZigBee device can send in the frequency ranges 868 MHz, 915 MHz, and 2.4 GHz with a power (in an embodiment with an effective isotropic radiated power (EIRP)) in the range of about 1 mW to about 10 mW. A Bluetooth device also sends in the license free ISM frequency band (Industrial, Scientific, and Medical band) between 2.402 GHz and 2.480 GHz (a class 1 device sends with up to 100 mW and usually have to use an automatic power control; a class 2 device sends with up to 2.5 mW; and a class 3 device sends with up to 1 mW). A digital transmission device in accordance with DECT operates in an own frequency band from 1.88 GHz to 1.9 GHz. The maximum transmission power of a DECT device (e.g. a DECT telephone or a DECT base station) is 250 mW per pulse, which corresponds to a radiated power of about 10 mW in average. A WLAN device in accordance with IEEE 802.11 b or in accordance with IEEE 802.11 g also transmits in the ISM band in the range from 2,400 GHz to 2,485 GHz, whereas a WLAN device in accordance with IEEE 802.11 a operates in the 5 GHz band. A WLAN device in accordance with IEEE 802.11 n should also operate in the 5 GHz band. A WLAN device in accordance with IEEE 802.11 p (Dedicated Short Range Communication, DSRC) for the application in vehicle-to-vehicle communication networks is intended to operate in the range from 5,850 GHz to 5,925 GHz. The maximum admissible transmission powers differ from region to region. By way of example, a WLAN device may transmit at 2.4 GHz with 100 mW in Germany, whereas it may transmit with 300 mW and more in the USA. At 5 GHz, transmission powers up to 30 mW, and, together with a transmit power control (TPC) and a dynamic frequency selection (DFS), transmission powers up to 1000 mW are allowed. It is under discussion that UWB communication devices are allowed to transmit in the frequency range from 3.1 GHz to 10.6 GHz with a maximum transmission power of 41.3 dBm/MHz, i.e. 70 nW/MHz or approximately 0.6 mW.

In an embodiment of the invention, energy saving technologies with a good coverage, robustness, short response times, short latencies an sufficient data rates are provided for the control functions of an ambient network such as e.g. for the multi access architecture in accordance with an embodiment of the invention. Furthermore, the control functions may be transmitted via a secure channel mainly in an All-IP communication network.

Thus, in an embodiment of the invention, the usage of an radio access technology which is efficient for a central control (e.g. with regard to the above mentioned criteria) of a communication network, e.g. a WAN, is provided exclusively for the control plane signaling, e.g. between the MRRM components, wherein the used radio access technology provides (in other words, takes over) the signaling and control of e.g. the MRRM components or any other suitable components in the ambient network for all radio access technologies involved. In the example of a WAN, this may be a dedicated radio channel in combination with a wired backbone network.

In an embodiment of the invention, in the case of a decentral control e.g. in a LAN, it is provided that the signalling may be taken over by the radio access technology that is most efficient in this LAN region. By way of example, in a dual-mode Bluetooth/Wireless-USB solution, Bluetooth may be used or provided for the signal transmission of the control plane data of both, the Bluetooth and the Wireless-USB.

In an embodiment of the invention, in any case, a radio channel may be used which covers the total quantity of all radio access technologies used in the ambient network.

In an embodiment of the invention, thus, high expenditure, high complexity, low energy efficiency of spectral efficiency of the operation of a plurality of control planes of different radio access technologies in parallel may be reduced or prevented. In addition, the security for example in the case of an IP (Internet Protocol) communication network may be increased by means of the dedicated exclusive radio channel for the control functions. In an embodiment of the invention, dual-mode and multi-mode ambient network terminal devices may be optimally set up with regard to coverage, data throughput, interference minimization, power control of the radio transmission by the provision of the "common" or "shared" control plane. Furthermore, it is not necessary to use overdimensioned physical layer implementations for the control functions.

In an embodiment of the invention, in the case of the application of two or more existing different radio access technologies in ambient network terminal devices as it is provided in an ambient network, a dedicated efficient radio access technology is exclusively assigned and applied for the control and the signaling of the control plane of all radio modems in a static or in a dynamic manner. Thus, in an embodiment of the invention, the "control plane" and the "user plane" are illustratively decoupled from each other for user data connections. The "control planes" of the connections is provided by one (e.g. exactly one) common radio access technology, which may allow a coverage over all radio access technologies used.

In an embodiment of the invention, a static assignment of a radio access technology is provided to implement a portion of the control plane or the entire control plane for a plurality of radio access technologies used for user data transmission.

In this embodiment, it is assumed that two or more different radio access technologies are integrated in one ambient network terminal, wherein the characteristics of the radio access technologies are different from each other. In an embodiment of the invention, one radio access technology will always be used, which includes all other used radio access technologies with regard to the coverage, for the execution and the implementation of the control plane function (partially or fully) in the ambient network terminal device. This radio access technology, e.g. implemented in the PHY communication layer (and optionally in addition e.g. in a higher communication layer such as the MAC communication layer), realizes for all other radio access technologies the signalling e.g. for the management of the communication connections, of the communication network and the mobility, so that the radio access technologies which are disburdened from the realization of "their" control plane functions, may execute or implement exclusively the user data connections.

One example is a dual-mode ambient network terminal device which has implemented the radio access technologies Bluetooth and UWB. In this case, it may be provided that the Bluetooth modem may take over the "control plane" for the UWB modem.

In another embodiment, a multi-mode ambient network terminal device may be provided which has implemented and integrated the radio access technologies DECT, WLAN, UWB and Bluetooth using correspondingly configured radio modems. In this case, it may be provided that the DECT radio modem having a large coverage executes the "control plane" for the other radio access technologies, namely the WLAN, UWB and Bluetooth modems in a LAN environment.

Another example may be seen in the usage of a combination of wireline components (in other words wireline access technologies) and wireless components (in other words wireless access technologies) in order to take over the "control plane" (fully or partially) in a WAN for a WLAN and cellular radio networks, for example.

In another embodiment of the invention, a dynamic assignment of a radio access technology is provided to implement a portion of the control plane or the entire control plane for a plurality of radio access technologies used for user data transmission.

In an extension of the above described static assignment, it may be provided to change an assignment of a radio access technology for the execution and implementation of the "control plane" (partially or fully) for other radio access technologies being integrated in the ambient network terminal device.

In an embodiment of the invention, two radio access technologies (e.g. a first radio access technology and a second radio access technology) take over the functionality of the "control plane" of other radio access technologies provided, e.g. a first radio access technology takes over the functionality of the "control plane" of the other radio access technologies (including the functionality of the "control plane" of the second radio access technology) in a PAN environment and in a LAN environment, and the second radio access technology takes over the functionality of the "control plane" of the other radio access technologies (including the functionality of the "control plane" of the first radio access technology) in a WAN environment.

Depending on the application, in an embodiment of the invention, the radio access technology that is more efficient with regard to one or more pre-defined criteria (such as e.g. coverage, spectrum requirement, power requirement, etc.) may be switched on, switched over or switched off.

In an embodiment of the invention, a third access technology circuit providing signal transmission in accordance with a third access technology to transmit user data encoded in accordance with the third access technology may be provided. In this embodiment, the second access technology circuit may be configured to transmit control data encoded in accordance with the third access technology.

The second access technology circuit may be configured to transmit the entire control data encoded in accordance with any access technology of a plurality of access technologies coupled to the second access technology circuit.

Furthermore, in an embodiment of the invention, a access technology selection circuit is provided to select the access technology used by the second access technology circuit. The access technology selection circuit may be configured to select the access technology taking into account at least one pre-defined efficiency criterion, wherein the at least one pre-defined efficiency criterion may be selected from a group of criteria consisting of: coverage, robustness, response time, latency, data rate.

FIG. 6 shows a multi access architecture 600 in accordance with another embodiment of the invention In an embodiment of the invention, the multi access architecture 600 includes one or more communication networks 602 (for reasons of simplicity, only one communication network 602 is shown). In an alternative embodiment of the invention, a communication terminal 602 may be provided instead or in addition to the one or more communication networks 602, e.g. a mobile phone, in accordance with UMTS e.g. a User Equipment (UE). In an embodiment of the invention, the multi access architecture 600 further includes one or more communication terminals 604, e.g. a mobile phone, in accordance with UMTS e.g. a User Equipment (UE) (for reasons of simplicity, only one communication terminal 604 is shown). Both, the communication network 602 and the communication terminal 604 have implemented a multiplicity of radio access technologies, e.g. a first radio access technology A, a second radio access technology B and one or more additional radio access technologies such as e.g. a third radio access technology Z.

In an embodiment of the invention, the communication network 602 includes a Multi Radio Resource Management (MRRM) component 606 (it should be noted that this component is optional). Furthermore, the communication network 602 includes a control plane component 608 configured to process control plane data and a user plane component 610 configured to process user plane data in accordance with the first radio access technology A. Moreover, the communication network 602 includes a control plane component 612 configured to process control plane data and a user plane component 614 configured to process user plane data in accordance with the second radio access technology B as well as a control plane component 616 configured to process control plane data and a user plane component 618 configured to process user plane data in accordance with the third radio access technology Z. An also provided radio interface component 620 is configured to implement physical layer functionality for signal transmission in accordance with the second radio access technology B and is provided for the transmission of the user plane data encoded in accordance with the respective communication protocols of the second radio access technology B. Furthermore, an also provided radio interface component 622 is configured to implement physical layer functionality for signal transmission in accordance with the third radio access technology Z and is provided for the transmission of the user plane data encoded in accordance with the respective communication protocols of the third radio access technology Z.

In an embodiment of the invention, the communication network 602 further includes a radio interface component 624 which is configured to implement physical layer functionality for signal transmission in accordance with the first radio access technology A and is provided for the transmission of the control plane data and, optionally, for the user plane data encoded in accordance with the respective communication protocols of the first radio access technology A. The radio interface component 624 is further configured for the transmission of the control plane data encoded in accordance with the respective communication protocols of the second radio access technology B and for the transmission of the control plane data encoded in accordance with the respective communication protocols of the third radio access technology Z. In other words, in an embodiment of the invention, the radio interface component 624 is (e.g. exclusively) provided for the transmission of the control data being encoded in accordance with all three (or, in alternative embodiments of the invention, even more) radio access technologies.

The communication terminal 604 also optionally includes a corresponding Multi Radio Resource Management (MRRM) component 626. Furthermore, the communication terminal 604 may include a control plane component 628 configured to process control plane data and a user plane component 630 configured to process user plane data in accordance with the first radio access technology A. Moreover, the communication terminal 604 may further include a control plane component 632 configured to process control plane data and a user plane component 634 configured to process user plane data in accordance with the second radio access technology B as well as a control plane component 636 configured to process control plane data and a user plane component 638 configured to process user plane data in accordance with the third radio access technology Z. An also provided radio interface component 640 is configured to implement physical layer functionality for signal transmission in accordance with the second radio access technology B and is provided for the transmission of the user plane data encoded in accordance with the respective communication protocols of the second radio access technology B. Furthermore, an also provided radio interface component 642 is configured to implement physical layer functionality for signal transmission in accordance with the third radio access technology Z and is provided for the transmission of the user plane data encoded in accordance with the respective communication protocols of the third radio access technology Z.

In an embodiment of the invention, the communication network 602 further includes a radio interface component 644 which is configured to implement physical layer functionality for signal transmission in accordance with the first radio access technology A and is provided for the transmission of the control plane data and, optionally, for the user plane data encoded in accordance with the respective communication protocols of the first radio access technology A. The radio interface component 644 is further configured for the transmission of the control plane data encoded in accordance with the respective communication protocols of the second radio access technology B and for the transmission of the control plane data encoded in accordance with the respective communication protocols of the third radio access technology Z. In other words, in an embodiment of the invention, the radio interface component 644 is (e.g. exclusively) provided for the transmission of the control data being encoded in accordance with all three (or, in alternative embodiments of the invention, even more) radio access technologies.

FIG. 7 shows a method 700 for transmitting data in accordance with an embodiment of the invention.

In 702, user data encoded in accordance with a first access technology are transmitted using a first access technology signal transmission.

In 704, control data encoded in accordance with the first access technology using a second access technology signal transmission are transmitted, wherein the second access technology is different from the first access technology.

In 706, control data encoded in accordance with the second access technology are transmitted using the second access technology signal transmission.

FIG. 8 shows a method 800 for transmitting data in accordance with another embodiment of the invention.

In 802, user plane data encoded in accordance with a communication protocol in accordance with the user plane of a first access technology are transmitted using a first access technology physical layer signal transmission.

In 804, control plane data encoded in accordance with a communication protocol in accordance with the user plane of a second access technology are transmitted using a second access technology physical layer signal transmission.

In 806, control plane data encoded in accordance with a communication protocol in accordance with the user plane of the first access technology are transmitted using the second access technology physical layer signal transmission.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A communication device, comprising:
   a first access technology circuit configured to provide a signal transmission in accordance with a first access technology to transmit only user data encoded in accordance with the first access technology, wherein the first access technology circuit is independent of a control plane circuit;
   a second access technology circuit configured to provide a signal transmission in accordance with a second access technology, wherein the second access technology is different from the first access technology, to transmit control data encoded in accordance with the first access technology and to transmit control data encoded in accordance with the second access technology;
   a third access technology circuit configured to provide a signal transmission in accordance with a third access technology to transmit user data encoded in accordance with the third access technology,
   wherein the second access technology circuit is configured to transmit control data encoded in accordance with the third access technology; and
   an access technology selection circuit configured to select the access technology used b the second access technology circuit taking into account at least one pre-defined efficiency criterion, wherein the at least one pre-defined efficiency criterion is at least one of coverage, robustness, response time, latency, or data rate.

2. The communication device of claim 1,
   wherein the first access technology circuit is configured to implement the physical layer of the first access technology; and
   wherein the second access technology circuit is configured to implement the physical layer of the second access technology.

3. The communication device of claim 1,
   wherein the first access technology or the second access technology is a radio access technology.

4. The communication device of claim 1,
   wherein the first access technology is a first radio access technology and the second access technology is a second radio access technology.

5. The communication device of claim 1, further comprising:
   a first user plane circuit configured to process user data in accordance with the first access technology, wherein the first user plane circuit is configured to implement at least a portion of the user plane functionality of the first access technology above the physical layer;
   wherein the first access technology circuit is coupled to the first user plane circuit.

6. The communication device of claim 1, further comprising:
   a second user plane circuit configured to process user data in accordance with the second access technology, wherein the second user plane circuit is configured to implement at least a portion of the user plane functionality of the second access technology above the physical layer.

7. The communication device of claim 6,
   wherein the second access technology circuit is coupled to the second user plane circuit.

8. The communication device of claim 1, further comprising:
   a first control plane circuit configured to process control data in accordance with the first access technology, wherein the first control plane circuit is configured to implement at least a portion of the control plane functionality of the first access technology above the physical layer;
   wherein the second access technology circuit is coupled to the first control plane circuit.

9. The communication device of claim 1, further comprising:
   a second control plane circuit configured to process control data in accordance with the second access technology, wherein the second control plane circuit is configured to implement at least a portion of the control plane functionality of the second access technology above the physical layer;
   wherein the second access technology circuit is coupled to the second control plane circuit.

10. The communication device of claim 1,
    wherein the second access technology circuit is configured to transmit the entire control data encoded in accordance with any access technology of a plurality of access technologies coupled to the second access technology circuit.

11. The communication device of claim 1, further comprising:
    an access technology selection circuit configured to select the access technology used by the second access technology circuit.

12. The communication device of claim 1,
    wherein the second access technology provides a radio channel covering a coverage area of all access technologies used.

13. A method for transmitting data, the method comprising:
    transmitting, by a first access technology circuit, only user data encoded in accordance with a first access technology independent of a control plane, using a first access technology signal transmission;
    transmitting, by a second access technology circuit, control data encoded in accordance with the first access technology using a second access technology signal transmission, wherein the second access technology is different from the first access technology;
    transmitting, by the second access technology circuit, control data encoded in accordance with the second access technology using the second access technology signal transmission;
    transmitting, by a third access technology circuit, user data encoded in accordance with a third access technology using a third access technology signal transmission,
    wherein the second access technology circuit is configured to transmit control data encoded in accordance with the third access technology; and
    selecting, by an access technology selection circuit, the access technology used by the second access technology circuit taking into account at least one pre-defined efficiency criterion, wherein the at least one pre-defined efficiency criterion is at least one of coverage, robustness, response time, latency, or data rate.

14. The method of claim 13,
    wherein the first access technology or the second access technology is a radio access technology.

15. The method of claim 13, further comprising:
    transmitting user data encoded in accordance with the second access technology using the second access technology signal transmission.

16. The method of claim 13, further comprising:
transmitting user data encoded in accordance with a third access technology using a third access technology signal transmission.

17. The method of claim 16, further comprising:
transmitting control data encoded in accordance with the third access technology using the second access technology signal transmission.

18. The method of claim 13,
wherein the entire control data encoded in accordance with any access technology of a plurality of access technologies is transmitted using the second access technology signal transmission.

19. The method of claim 13, further comprising:
selecting the access technology used for the second access technology signal transmission.

20. The method of claim 13,
wherein the second access technology signal transmission provides a radio channel covering a coverage area of all access technologies used.

21. A communication device, comprising:
a first circuit configured to provide signal transmission in accordance with a first access technology to transmit only user plane data encoded in accordance with a communication protocol in accordance with the user plane of the first access technology, wherein the first circuit is independent of a control plane circuit;
a second circuit configured to provide signal transmission in accordance with a second access technology to transmit control plane data encoded in accordance with a communication protocol in accordance with the control plane of the first access technology and to transmit control plane data encoded in accordance with a communication protocol in accordance with the control plane of the second access technology;
a third circuit configured to provide a signal transmission accordance with a third access technology to transmit user data encoded in accordance with a communication protocol in accordance with the user lane of the third access technology,
wherein the second circuit is configured to transmit control plane data encoded in accordance with the communication protocol in accordance with the control plane of the third access technology; and
an access technology selection circuit configured to select the access technology used by the second access technology circuit into account at least one pre-defined efficiency criterion, wherein the at least one pre-defined efficiency criterion is at least one of coverage, robustness, response time, latency, or data rate.

22. The communication device of claim 21,
wherein the first access technology is a first radio access technology and the second access technology is a second radio access technology.

23. A method for transmitting data, the method comprising:
transmitting by a first access technology circuit, only user plane data encoded in accordance with a communication protocol in accordance with the user plane of a first access technology independent of a control plane, using a first access technology physical layer signal transmission;
transmitting, by a second access technology circuit, control plane data encoded in accordance with a communication protocol in accordance with the user plane of a second access technology using a second access technology physical layer signal transmission;
transmitting, by the second access technology circuit, control plane data encoded in accordance with a communication protocol in accordance with the user plane of the first access technology using the second access technology physical layer signal transmission;
transmitting, by a third access technology circuit, control plane data encoded in accordance with a communication protocol in accordance with the user plane of a third access technology using a third access technology physical layer signal transmission,
wherein the second access technology circuit is configured to transmit control plane data encoded in accordance with a communication protocol in accordance with the control plane of the third access technology; and
selecting, by an access technology selection circuit, the access technology used by the second access technology circuit taking into account at least one pre-defined efficiency criterion, wherein the at least one pre-defined efficiency criterion is at least one of coverage, robustness, response time latency, or data rate.

24. The method of claim 23, further comprising:
transmitting user plane data encoded in accordance with a communication protocol in accordance with the user plane of the second access technology using the second access technology physical layer signal transmission.

* * * * *